United States Patent [19]
Bihrer

[11] Patent Number: 6,006,568
[45] Date of Patent: Dec. 28, 1999

[54] MULTI-PIECE HYDROFORMING TOOL

[75] Inventor: Hans Otto Bihrer, Canton, Mich.

[73] Assignee: The Budd Company, Troy, Mich.

[21] Appl. No.: 09/074,921

[22] Filed: May 8, 1998

Related U.S. Application Data

[60] Provisional application No. 60/078,697, Mar. 20, 1998.
[51] Int. Cl.⁶ .......................... B21D 26/02; B21D 39/08
[52] U.S. Cl. ................................ 72/60; 72/61; 29/421.1
[58] Field of Search .................... 72/58, 59, 60, 72/61, 62, 63; 29/421.1

[56] References Cited

U.S. PATENT DOCUMENTS

| | | |
|---|---|---|
| 1,000,574 | 8/1911 | Bauroth . |
| 1,926,353 | 9/1933 | Spatta . |
| 2,203,868 | 6/1940 | Gray et al. . |
| 2,205,893 | 6/1940 | Unger . |
| 3,273,916 | 9/1966 | Tillery . |
| 3,350,905 | 11/1967 | Ogura et al. . |
| 3,358,489 | 12/1967 | Hutchins . |
| 3,564,886 | 2/1971 | Nakamura . |
| 3,583,188 | 6/1971 | Nakumura . |
| 3,672,194 | 6/1972 | Martin . |
| 3,685,327 | 8/1972 | Nakamura . |
| 3,798,943 | 3/1974 | Benteler et al. . |
| 3,914,969 | 10/1975 | Banks . |
| 4,237,713 | 12/1980 | Benteler et al. . |
| 4,267,718 | 5/1981 | Benteler et al. . |

(List continued on next page.)

FOREIGN PATENT DOCUMENTS

| | | |
|---|---|---|
| 1055236 | 5/1979 | Canada . |
| 0 036 365 A1 | 3/1981 | European Pat. Off. . |
| 0 372 360 A2 | 6/1990 | European Pat. Off. . |
| 0 588 528 A1 | 3/1994 | European Pat. Off. . |
| 0 683 305 A2 | 11/1995 | European Pat. Off. . |
| 0 686 440 A1 | 12/1995 | European Pat. Off. . |
| 0 758 565 A1 | 2/1997 | European Pat. Off. . |
| 610114 | 3/1935 | Germany . |
| 37-9318 | 7/1962 | Japan . |
| 38-19434 | 9/1963 | Japan . |
| 44-21969 | 9/1969 | Japan . |
| 56-17132 | 2/1981 | Japan . |
| 61-49735 | 3/1986 | Japan . |
| 385146 | 3/1965 | Switzerland . |
| 2 304 613 | 3/1997 | United Kingdom . |

OTHER PUBLICATIONS

Dohmann/Klas, "Methods of Tube Forming" *Stips Sheets Tubes*, (Mar. 1986), pp. 39–41.
Sawyer, Christopher A., "Hydro–Forming is Hot", *Automotive Industries*, (Jun., 1991), pp. 49, 51.
Mason, Murray, "Hydroform Tubes for Automotive Body Structure Applications", *SAE Technical Paper Series*, Series No. 930575, (May, 1993), pp. 59–64.
Pennington, J. Neiland, "Hydroforming: More part for less cost in GM luxury/performance cars", *Modern Metals*, (Oct., 1994), pp. 36, 38, 40–41.
"Hyprotec Delivery to North America Completed", *Hyprotec –News*, (1995), pp. 1–4.
"The Modular IHP Plant System", *H&B Hyprotec Technologie oHG*, (Jan., 1995).
Christensne, William L., "Hydroforming of Tublar Sections", *MetalForming*, (Oct., 1995), p. 36–38, 40, 43.
Prof. Dr.–Ing. Kurt Lange, a German publication entitled; *Industrie–Anzeiger*, (May 10, 1996), pp. 107–110; (Jun. 17, 1966) pp. 137–140 (translation unavailable).

*Primary Examiner*—David Jones
*Attorney, Agent, or Firm*—Harness, Dickey & Pierce, P.L.C.

[57] ABSTRACT

A multi-piece hydroforming tool is provided having a tooling die and a hydraulic pressure source. The tooling die includes a plurality of tooling cavities. Each tooling cavity includes a injector manifold in fluid communication with the hydraulic pressure source. The injector manifolds supply pressurized hydraulic fluid to each of the plurality of tooling cavities independently. Thus, multiple pieces may be formed simultaneously and independently, thereby minimizing the need to discard all the hydroformed pieces if one piece become defective.

12 Claims, 6 Drawing Sheets

U.S. PATENT DOCUMENTS

| | | |
|---|---|---|
| 4,317,348 | 3/1982 | Halene et al. . |
| 4,319,471 | 3/1982 | Benteler et al. . |
| 4,354,369 | 10/1982 | Hamilton . |
| 4,437,326 | 3/1984 | Carlson . |
| 4,567,743 | 2/1986 | Cudini . |
| 4,619,129 | 10/1986 | Petkov et al. . |
| 4,751,835 | 6/1988 | Galaniuk et al. . |
| 4,761,982 | 8/1988 | Snyder . |
| 4,763,503 | 8/1988 | Hughes et al. . |
| 4,901,552 | 2/1990 | Ginty et al. . |
| 4,936,128 | 6/1990 | Story et al. . |
| 4,951,492 | 8/1990 | Vogt . |
| 5,107,693 | 4/1992 | Olszewski et al. . |
| 5,157,969 | 10/1992 | Roper . |
| 5,233,854 | 8/1993 | Bowman et al. . |
| 5,239,852 | 8/1993 | Roper . |
| 5,279,142 | 1/1994 | Kaiser . |
| 5,303,570 | 4/1994 | Kaiser . |
| 5,321,964 | 6/1994 | Shimanovski et al. . |
| 5,333,775 | 8/1994 | Bruggemann et al. . |
| 5,339,667 | 8/1994 | Shah et al. . |
| 5,353,618 | 10/1994 | Roper et al. . |
| 5,363,544 | 11/1994 | Wells et al. . |
| 5,372,026 | 12/1994 | Roper . |
| 5,372,027 | 12/1994 | Roper et al. . |
| 5,398,533 | 3/1995 | Shimanovski et al. . |
| 5,415,021 | 5/1995 | Folmer . |
| 5,419,791 | 5/1995 | Folmer . |
| 5,435,163 | 7/1995 | Schäfer . |
| 5,445,001 | 8/1995 | Snavely . |
| 5,460,026 | 10/1995 | Schäfer . |
| 5,471,857 | 12/1995 | Dickerson . |
| 5,475,911 | 12/1995 | Wells et al. . |
| 5,481,892 | 1/1996 | Roper et al. . |
| 5,553,474 | 9/1996 | Nokajima et al. . |
| 5,557,961 | 9/1996 | Ni et al. ................................. 72/61 |
| 5,561,902 | 10/1996 | Jacobs et al. ........................ 72/61 |
| 5,600,983 | 2/1997 | Rigsby ................................... 72/61 |
| 5,641,176 | 6/1997 | Alatalo . |
| 5,662,349 | 9/1997 | Hasshi et al. . |
| 5,673,929 | 10/1997 | Alatalo . |
| 5,799,524 | 9/1998 | Schafer et al. . |
| 5,862,877 | 1/1999 | Horton et al. ........................ 72/61 |

# MULTI-PIECE HYDROFORMING TOOL

CROSS-REFERENCE TO RELATED APPLICATIONS

This application is related to the co-pending U.S. patent applications Ser. No. 09/074,922 entitled "HYDROFORMED CONTROL ARM," filed on May 8, 1998; Ser. No. 09/247,457 entitled "METHOD OF HYDROFORMING MULTI-LATERAL MEMBERS FROM ROUND TUBES," filed on Feb. 9, 1999; and Ser. No. 08/828,405 entitled "FORMING TECHNIQUE USING DISCRETE HEATING ZONES," filed on Mar. 28, 1997.

This case claims benefit of Provisional Application 66/078,697 filed Mar. 20, 1998.

BACKGROUND OF THE INVENTION

FIELD OF THE INVENTION

The present invention relates to a hydroforming tool and, more particularly, to a multi-piece hydroforming tool capable of independently forming multiple control arms during a single die cycle.

BACKGROUND AND SUMMARY OF THE INVENTION

Hydroforming tools are commonly used in the manufacture of structural members for various industries, such as the automotive industry, where strength, weight, and manufacturing productivity are design factors. Hydroforming is the method of expanding a continuous elongated tube to closely correspond to a cavity in a die. The continuous elongated tube is expanded by increasing the hydraulic pressure within the interior of the tube to force the walls of the tube outward. Consequently, hydroforming tools enable relatively complex structural members to be manufactured from a single, continuous elongated tube. This method increases the structural integrity of the member being formed while, simultaneously, decreases the overall weight of the member.

Typically, hydroforming tools form one part per die cycle. A die cycle is complete each time the die is opened. This method of forming a single part per die cycle fails to achieve optimal productivity levels for industries with high manufacturing quotas, such as the automotive industry.

Consequently, hydroforming tools have attempted to produce multiple parts per die cycle. These multi-piece designs typically have only two injection cylinders. The injection cylinders inject hydraulic fluid into the hydroforming cavities to form the multiple pieces. However, if any defect occurs during the hydroforming process (e.g. parts splitting), then the process is stopped and all the parts are discarded. This method, consequently, fails to maximize production output and minimize production waste.

The present invention finds particular utility in the manufacture of vehicle control arms. Thus, a brief background of control arms as used in vehicle wheel suspension systems is believed to be beneficial. It should be appreciated that the multi-piece hydroforming machine according to the present invention may be used to form pieces other than control arms.

Control arms are commonly used in vehicle wheel suspension systems to provide a stable connection between multiple suspension components. A traditional control arm 100 is shown in FIG. 1, wherein control arm 100 is pivotally connected between the axle housing 102 and the vehicle chassis 104. The pivot connection allows for vertical displacement of the axle and wheel assembly. Traditional control arm 100 further includes a ball joint 106 pivotally coupled to a steering knuckle 108. Still further, traditional control arm 100 includes at least one rubber bushing 110 connected to the ball joint 106.

In operation, control arms must withstand extreme driving and braking torques created by the vehicle. To this end, it is necessary for control arms to be designed to maximize their structural integrity for improved tolerance of high vehicle loading forces caused by severe road damage, heavy braking, etc. It is also preferable for control arms to be designed to minimize the overall weight of the wheel suspension system.

As seen in FIG. 2, a cross-section of a typical control arm 112 is shown having a convoluted "hat-shaped" cross-section. Although the "hat-shaped" design is relatively simple to manufacture, it may not afford maximum structural integrity. Additionally, the hat-shaped design generally requires the use of bushing element 110 to properly receive ball joint 106. Consequently, the "hat-shaped" design often fails to provide an optimal system.

Another typical control arm 114 is shown in FIG. 3 having a two-piece stamped construction, wherein the pieces 116, 118 of the control arm are welded together. This design provides improved structural rigidity over the prior design shown in FIG. 2. However, like the prior design, the design shown in FIG. 3 requires the use of bushing element 110 to properly receive ball joint 106. Moreover, this design fails to minimize the overall weight of the system.

Accordingly, there exists a need in the relevant art to provide a hydroforming machine capable of hydroforming multiple vehicle control arms simultaneously. Furthermore, there exists a need in the relevant art to provide a multi-piece hydroforming machine capable of forming each piece independently to minimize production waste. Moreover, there exists a need in the relevant art to improve manufacturing methods to increase production, without compromising product reliability.

According to a preferred embodiment of the present invention, a multipiece hydroforming tool for independently forming a plurality of hydroformed pieces is provided having a tooling die. The tooling die includes a plurality of tooling cavites disposed therein. The hydroforming tool further includes a hydraulic pressure source and a plurality of injector manifolds. Each injector manifold is in fluid communication with the hydraulic pressure source and the corresponding tooling cavity. This arrangement enables each hydroformed piece to be formed independently from the others. Consequently, multiple pieces may be formed simultaneously, without the need to scrap all the pieces if one piece becomes defective.

According to a more preferred embodiment of the present invention, the multi-piece hydroforming tool further includes a plurality of forming tools. The plurality of forming tools enables cavities to be formed in each hydroformed piece. Additionally, the multi-piece hydroforming tool includes a plurality of piercing tools. The piercing tools enable apertures to also be formed in each hydroformed piece. Still further, the multi-piece hydroforming tools includes a plurality of extruding tools for extruding a plurality of bores in each hydroformed piece.

Further areas of applicability of the present invention will become apparent from the detailed description provided hereinafter. It should be understood however that the detailed description and specific examples, while indicating preferred embodiments of the invention, are intended for purposes of illustration only, since various changes and modifications within the spirit and scope of the invention will become apparent to those skilled in the art from this detailed description.

BRIEF DESCRIPTION OF THE DRAWINGS

The present invention will become more fully understood from the detailed description and the accompanying drawings, wherein.

DETAILED DESCRIPTION OF THE PREFERRED EMBODIMENT

The following description of the preferred embodiment is merely exemplary in nature and is in no way intended to limit the invention, its application, or uses. For example, the techniques disclosed herein may have utility in forming a wide variety of different parts.

Figure 1:
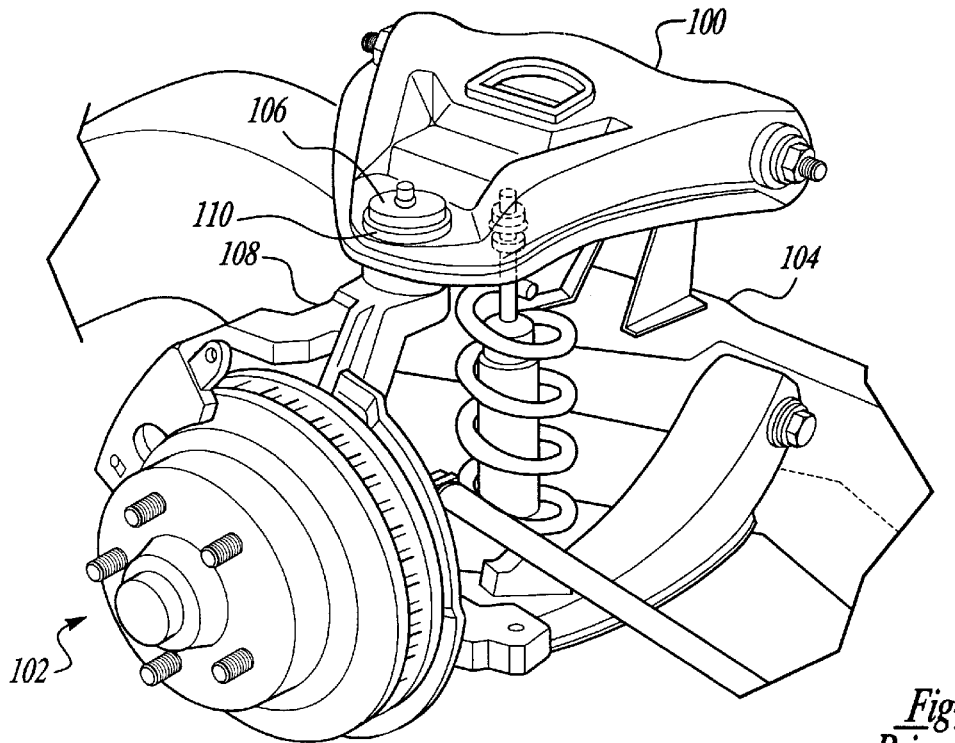
FIG. 1 is a perspective view of a wheel suspension system according to a prior art method of assembly.
Figure 2:
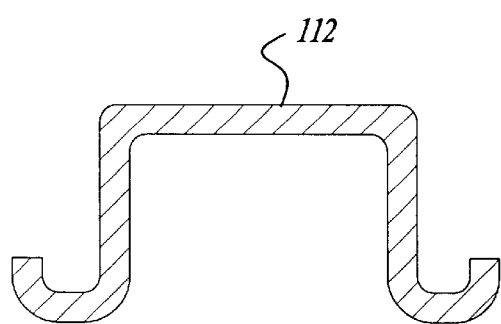
FIG. 2 is a partial cross-sectional view of a prior art vehicle control arm.
Figure 3:
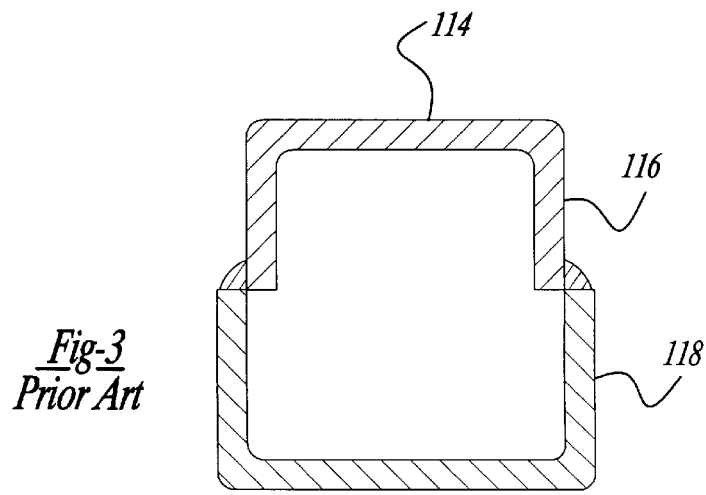
FIG. 3 is a partial cross-sectional view of another prior art vehicle control arm.
Figure 4:
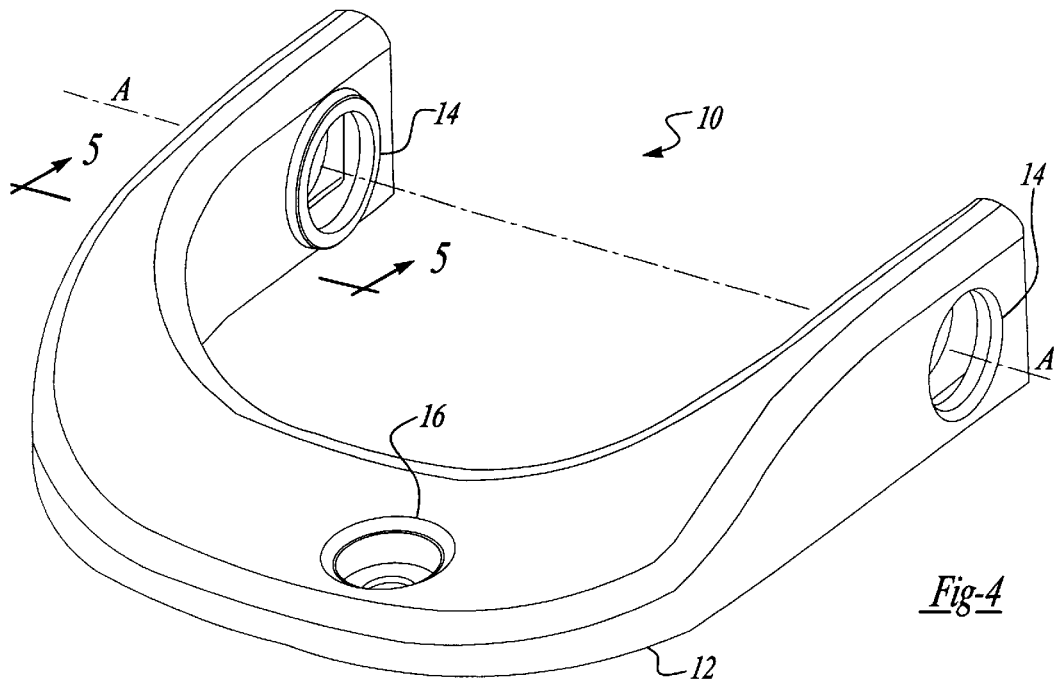
FIG. 4 is a perspective view of a hydroformed control arm.

Referring to the drawings, a hydroformed vehicle control arm 10, and a method of making the same, is provided having a generally U-shaped member 12. U-shaped member 12 is hydroformed from a single, constant-radius circular tube. As best seen in FIG. 4, hydroformed control arm 10 further includes a pair of pivot bores 14. Pivot bores 14 are disposed on each end of generally U-shaped member 12 to enable hydroformed control arm 10 to pivot about an axis "A". Hydroformed control arm 10 further includes a ball joint cavity 16. Ball joint cavity 16 is generally located at an apex of U-shaped member 12. As will be described, ball joint cavity 16 provides means for retaining a ball joint 18 (FIG. 17) therein, without the need of the additional bushing element 110. Ball joint 18 includes a base portion 18a and a threaded portion 18b to fixedly interconnect hydroformed control arm 10 with steering knuckle 108.

Figure 5:
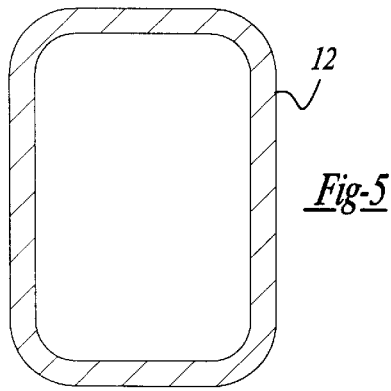
FIG. 5 is a cross-sectional view of FIG. 4, taken along line 5—5.

As can be appreciated from FIGS. 4 and 5, hydroformed control arm 10 is preferably formed with varying cross-sectional areas to provide optimal structural rigidity and performance. Furthermore, hydroformed control arm 10 is seamlessly constructed, thereby requiring no welding or stamping.

According to a preferred method of forming hydroformed control arm 10, a straight tube having uniform wall thickness is first provided (not shown). By way of non-limiting example, the tube is approximately three (3) feet in length, two (2) inches in diameter, made of Steel 1008–1010 having a wall thickness of one-tenth (0.1) inch. More preferably, the tube is welded with scarfed weld seams. Generally straight tubes are readily available in the marketplace to facilitate mass production of hydroformed control arm 10.

Figure 6:
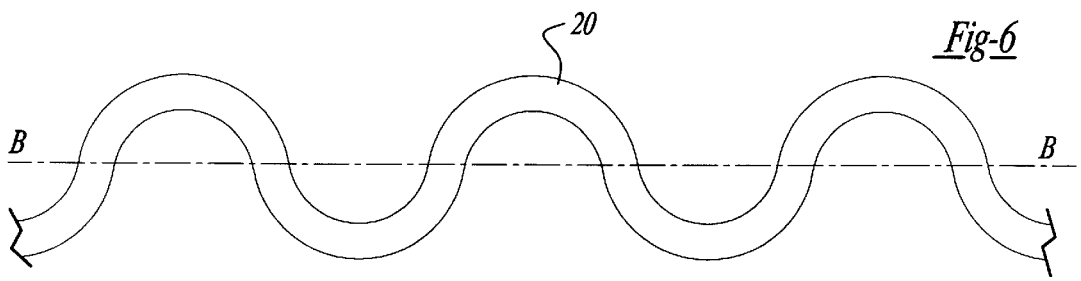
FIG. 6 is a top plan view of an elongated S-shaped constant-radius tube which is used as starting material to make the control arms.
Figure 7:
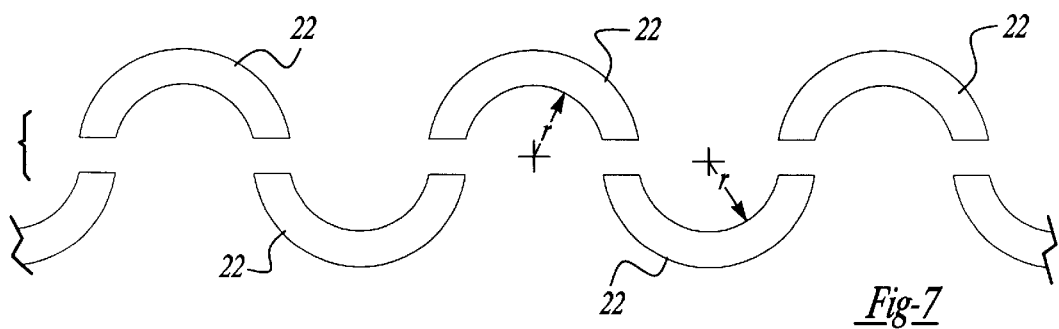
FIG. 7 is a top plan view of a plurality of U-shaped round tubes which have been cut from the tube of FIG. 6.

During manufacture, the generally straight tube is bent along its length to form a tube 20 having generally serpentine or S-shaped bends. Mandrels are preferably used during the bending process, if the combination of the tube wall thickness, tube material and bending radius is likely to cause wrinkling in S-shaped tube 20. S-shaped tube 20 is then cut along a center line "B" to form a plurality of generally U-shaped tubes 22, each tube having a constant radius "r", as seen in FIGS. 6 and 7.

Figure 8:
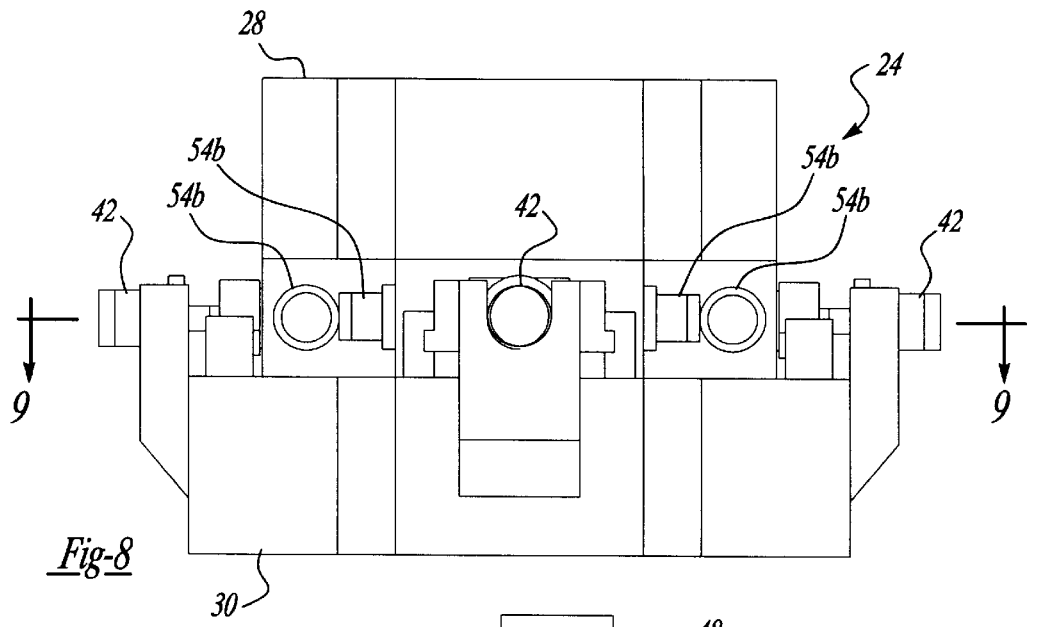
FIG. 8 is a front view of a multi-piece hydroforming tool.
Figure 9:
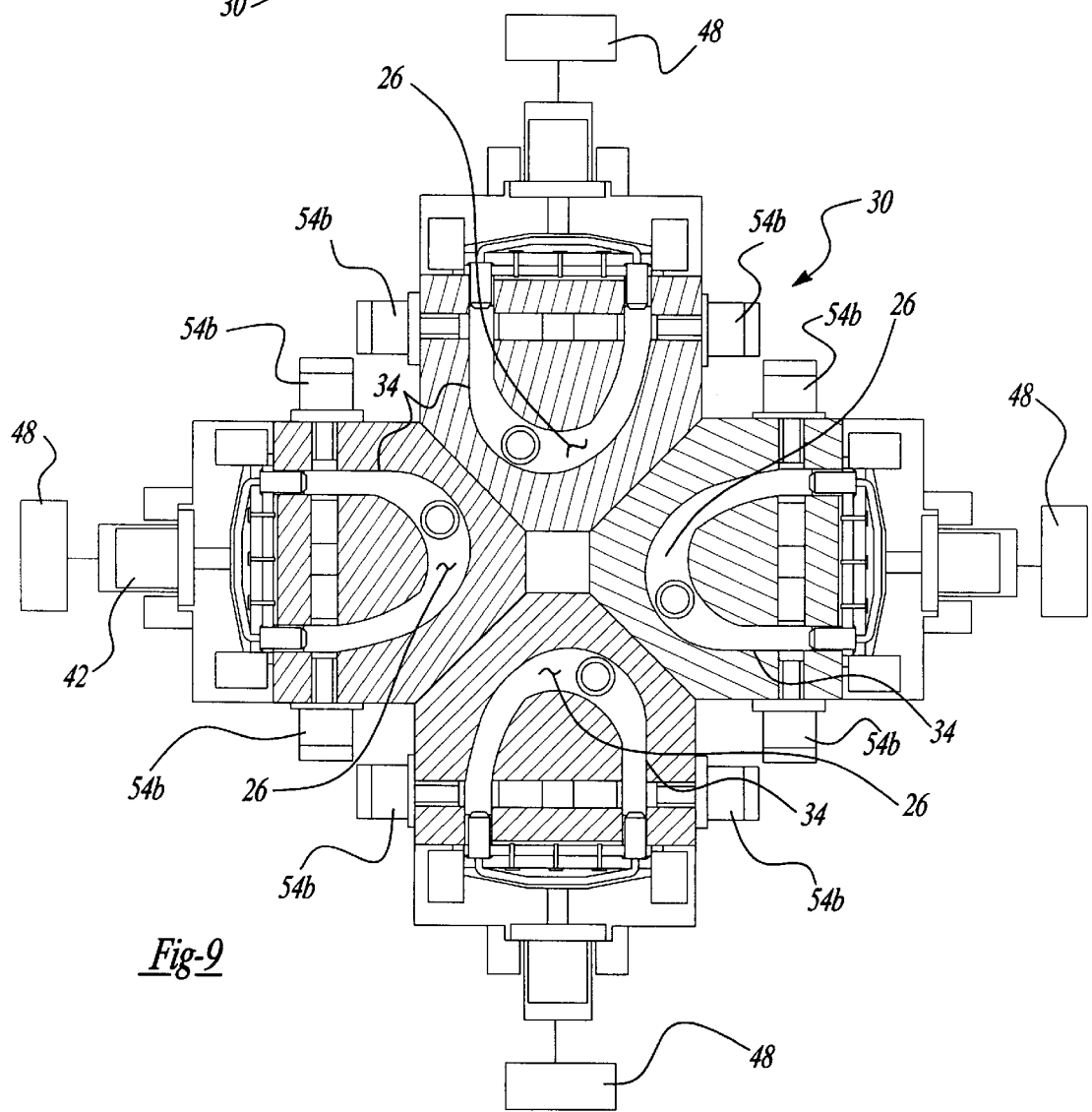
FIG. 9 is a cross-sectional view of FIG. 8, taken along line 9—9.
Figure 10A:
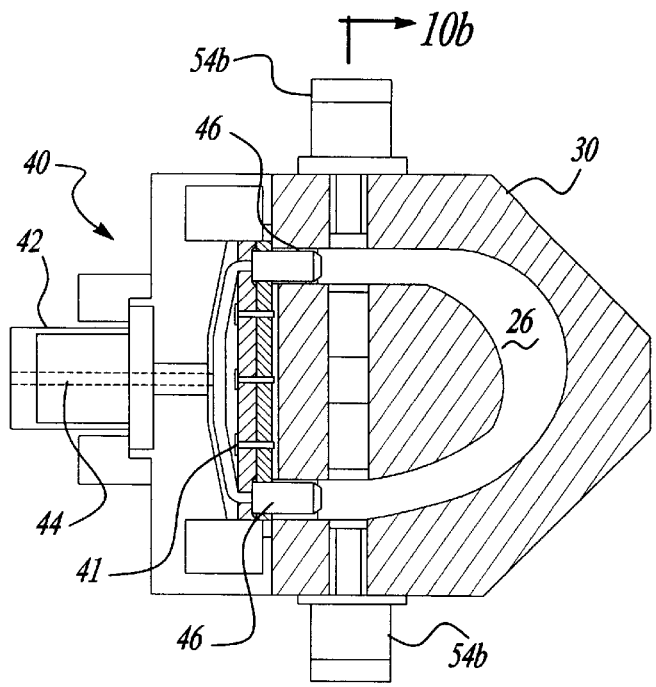
FIG. 10a is an exploded view, with portions in cross-section, of the multi-piece hydroforming tool.
Figure 10B:
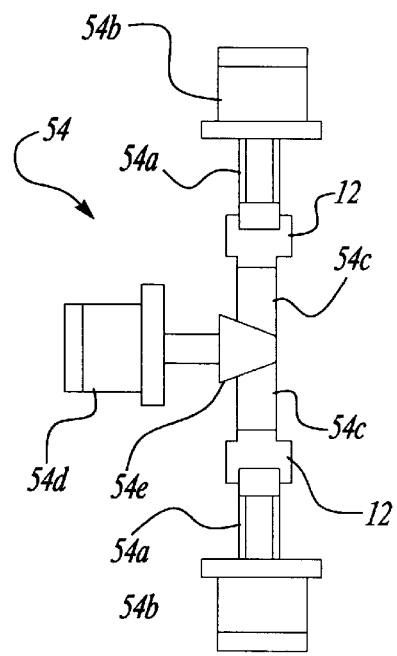
FIG. 10b is a cross-sectional view of FIG. 10a, taken along line 10b—10b.
Figure 11:
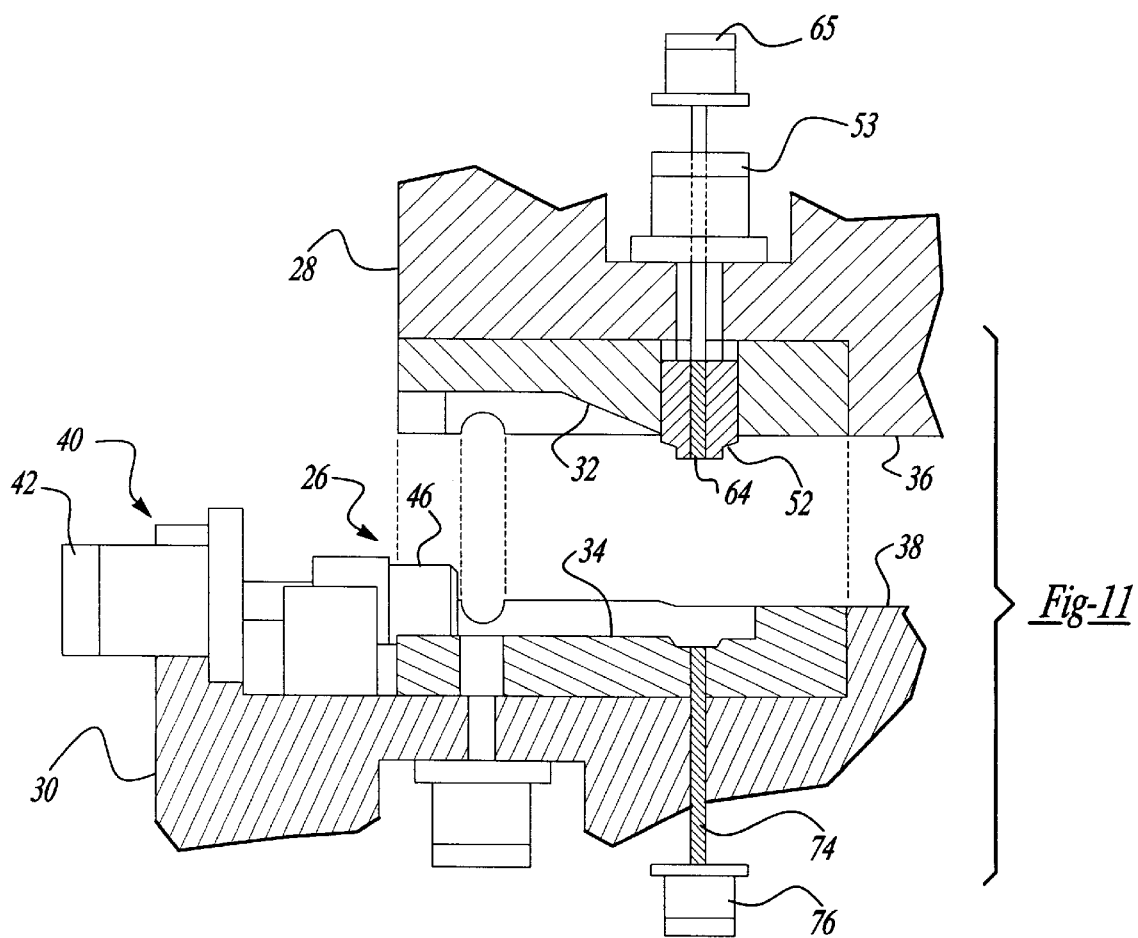
FIG. 11 is an exploded cross-sectional view of the multi-piece hydroforming tool in an opened position.
Figure 12:
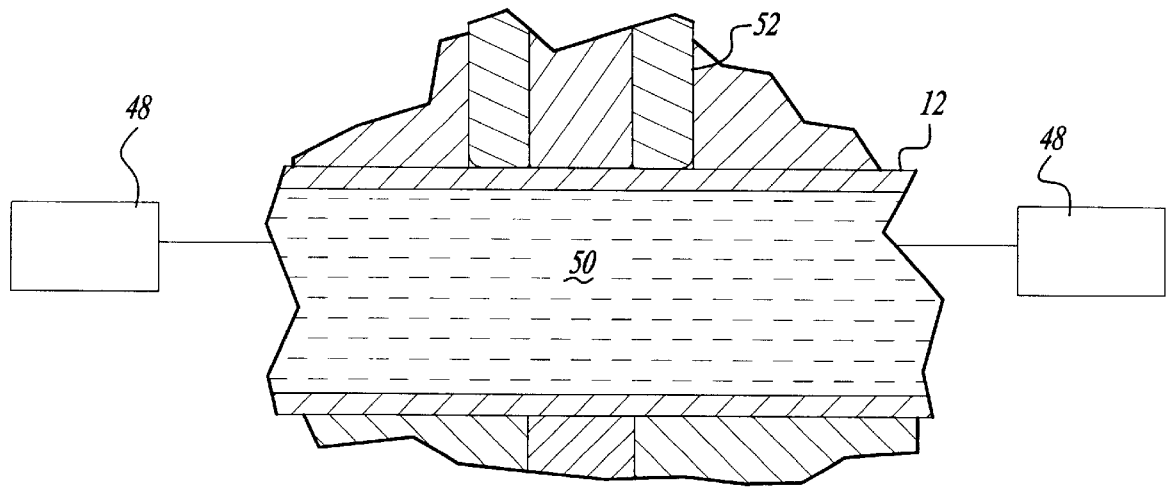
FIGS. 12–16 illustrate progressive steps in forming the ball joint cavity in the control arm.

Referring to FIG. 8 through 11, a multi-piece hydroforming tool 24 is shown having preferably four U-shaped cavities 26 disposed therein. As best seen in FIG. 8, multi-piece hydroforming tool 24 includes an upper die member 28 and a lower die member 30. Upper die member 28 and lower die member 30 include opposed surfaces 32, 34, respectively. As best seen in FIG. 11, opposed surface 32 is disposed in a bottom portion 36 of upper die member 28. Similarly, opposed surface 34 is disposed in a top portion 38 of lower die member 30. Opposed surfaces 32, 34 are aligned and spaced to define U-shaped cavity 26 when bottom portion 36 of upper die member 28 contacts top portion 38 of lower die member 30.

Referring to FIGS. 10a, and 11, multi-piece hydroforming tool 24 further includes an injector manifold 40 secured to each U-shaped cavity 26 using a plurality of pre-stretched fasteners 41. Injector manifold 40 delivers pressurized hydraulic fluid to U-shaped cavity 26. Specifically, injector manifold 40 includes an inlet port 42 and a fluid aperture 44 extending through a pair of fluid nozzles 46. Fluid aperture 44 defines fluid communication means between inlet port 42 and generally U-shaped cavity 26.

As shown in FIG. 9, multi-piece hydroforming tool 24 still further includes a hydraulic pressure source 48 in fluid communication with inlet port 42. Hydraulic pressure source 48 provides hydraulic fluid 50 (FIGS. 12–16) under extreme pressure, typically in the range of 15,000 psi to 90,000 psi, to each inlet port 42.

Turning to FIG 11, multi-piece hydroforming tool 24 includes a plurality of forming tools 52 provided in upper die member 28 of multipiece hydroforming tool 24. Each U-shaped cavity 26 includes at least one forming tool 52 and corresponding forming cylinder 53 for forming ball joint cavity 16 in hydroformed control arm 10.

As best seen in FIGS. 9, 10a, and 10 b, multi-piece hydroforming tool 24 further includes an extruding device 54 for extruding pivot bores 14 in hydroformed control arm 10. Specifically, each extruding device 54 includes a pair of outer extruding tools 54a preferably disposed orthogonal to the ends of U-shaped cavity 26. Each outer extruding tool 54a is operably connected to corresponding outer extruding cylinder 54b. In operation, outer extruding cylinder 54b drives outer extruding tool 54a into the sides of U-shaped tube 12, thereby forming an outer pivot bore depression.

Similarly, each extruding device 54 further includes a pair of inner extruding tools 54c preferably disposed orthogonal to the ends of U-shaped cavity 26 and further disposed coaxially oriented relative to outer extruding tools 54a. Inner extruding tools 54c are operably connected to a single inner extruding cylinder 54d. In operation, inner pivot bore depressions are formed by retracting an inner extruding ram 54e using inner extruding cylinder 54d, thereby retracting inner extruding tools 54c. Internal hydraulic pressure within U-shaped tube 12 causes a pair of inner pivot bore depression to be formed. After hydroforming, pivot bores 14 are formed by preferably drilling through inner and outer pivot bore depressions. However, it is anticipated that pivot bores 14 may also be formed by cutting or boring depending on tolerance requirements.

During operation of multi-piece hydroforming tool 24, upper die member 28 is preferably moved from a closed position to an opened position. Generally U-shaped round tubes 22 are then placed in generally U-shaped cavities 26 of multi-piece hydroforming tool 24. Generally U-shaped round tubes 22 are oriented such that the ends of generally U-shaped round tube 22 extend outward from U-shaped cavities 26. Upper die member 28 is then moved to a closed position. A closed position is defined as the point when bottom portion 36 of upper die member 28 contacts top portion 38 of lower die member 30. Injector manifolds 42 are then positioned to deliver pressurized hydraulic fluid 50 to U-shaped cavities 26. Specifically, injector manifolds 42 are retained in multi-piece hydroforming tool 24 using a plurality of pre-scretched fasteners (not shown). The prescretched fasteners are preferably attached to lower die member 30, thereby offsetting the hydroforming fluid pressure. A pair of fluid nozzles 46 of injector manifold 42 are in fluid communication with the opened ends of generally U-shaped round tube 22, thereby creating a fluid seal between fluid nozzle 46 and the ends of U-shaped round tube 22.

Referring to FIG. 9, hydraulic pressure source 48 forces hydraulic fluid 50 into an interior volume of generally U-shaped round tube 22 such that U-shaped round tube 22 expands to closely conform to the shape of opposed surfaces 32, 34 of U-shaped cavity 26. This technique is known as hydroforming.

Figure 13:
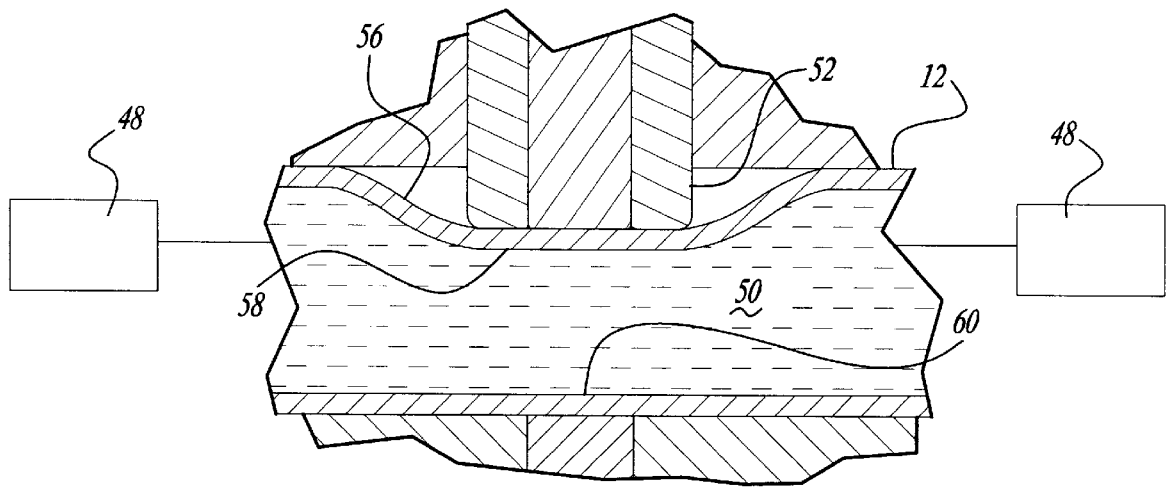
Figure 14:
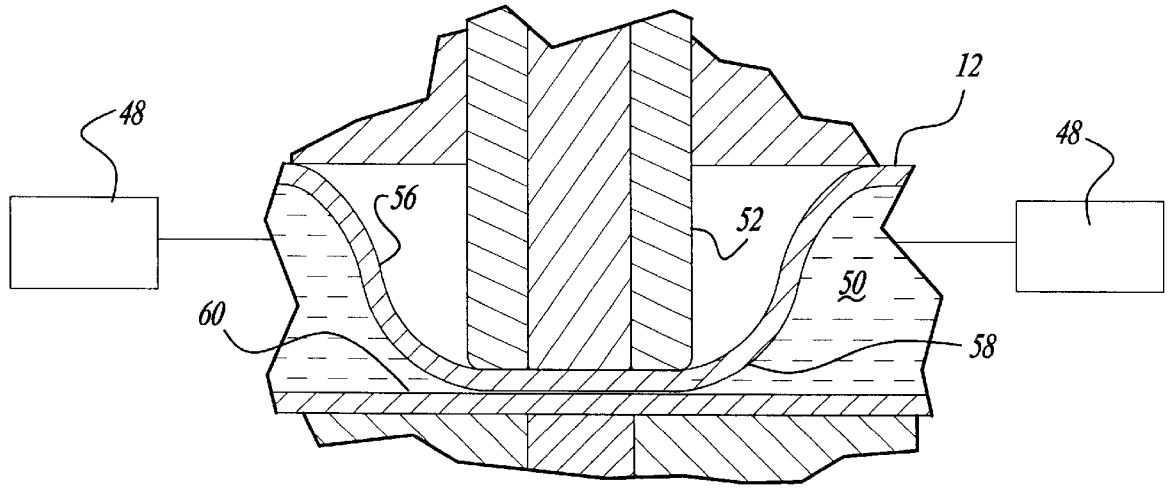

Referring to FIGS. 12 through 16, a method of forming ball joint cavity 16 in hydroformed control arm 10 is provided. As seen in FIG. 11 and as noted above, hydraulic pressure source 48 provides hydraulic fluid 50 at extreme pressure so as to expand U-shaped round tube 22 to conform with opposed surfaces 32, 34 of multi-piece hydroforming tool 24. As best seen in FIG. 13, forming tool 52 extends from opposed surface 32 of upper die member 28 and applies pressure to form a generally sloping depression 56 in hydroformed control arm 10. This step allows uniform stretching of the material of hydroformed control arm 10. The uniform stretching of the material minimizes possible stress fractures formed during manufacture. Forming tool 52 continues to form sloping depression 56 until a first interior wall 58 of hydroformed control arm 10 contacts an opposing second interior wall 60. The contact prevents further movement of forming tool 52.

Figure 15:
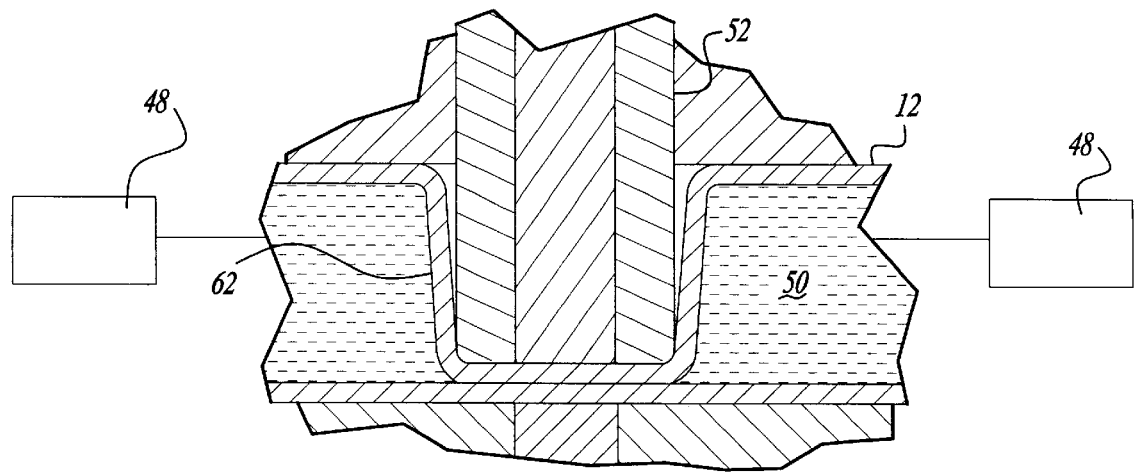
Figure 16:
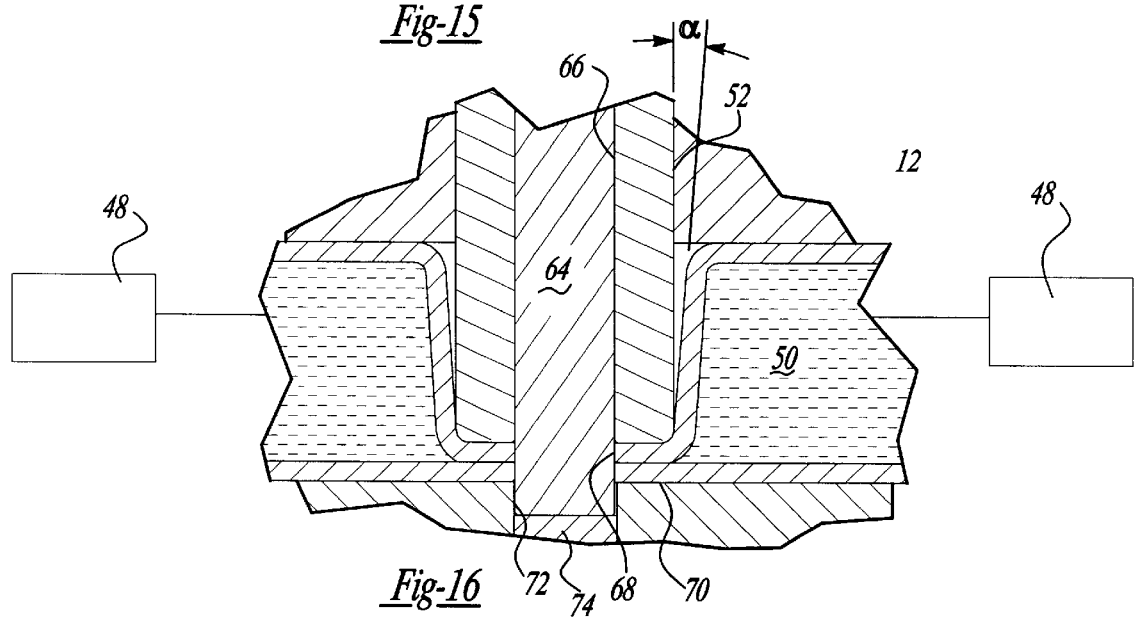

As best seen in FIG. 15, once forming tool 52 has completely formed sloping depression 56, the pressure of hydraulic fluid 50 is increased to force the walls of the tube defining sloping depression 56 to generally conform to the shape of forming tool 52. Generally vertical walls 62 of ball joint cavity 16 are thereby formed. As can be appreciated from FIG. 15, generally vertical wall 62 include a draft angle "α" to allow for improved tooling of hydroformed control arm 10.

Without intending to be limited by example, a draft angle of approximately three to four degrees (3–4°) from vertical has been found to be sufficient.

Referring to FIGS. 11–16, a piercing tool 64 is shown as being slidably received within a bore 66 of each forming tool 52. Piercing tool 64 is further shown operably connected to a mechanical device or piercing cylinder 65. Piercing tool 64 creates an aperture 68 in a bottom portion 70 of ball joint cavity 16. Specifically, piercing cylinder 65 forces piercing tool 64 through first interior wall 58 and second interior wall 60 while forming tool 52 remains in ball joint cavity 16. During the piercing process, piercing tool 64 is received within a corresponding receiving chamber 72 of lower die member 30. Receiving chamber 72 is created by retracting a receiving tool 74 using a receiving tool cylinder 76. This method enables opposed surface 34 to remain flat during hydroforming of U-shaped member 12, yet accommodate an end of piercing tool 64 during the piercing operation. A completed hydroformed control arm 10 is then removed from generally U-shaped cavity 26 of multi-piece hydroforming tool 24.

Figure 17:
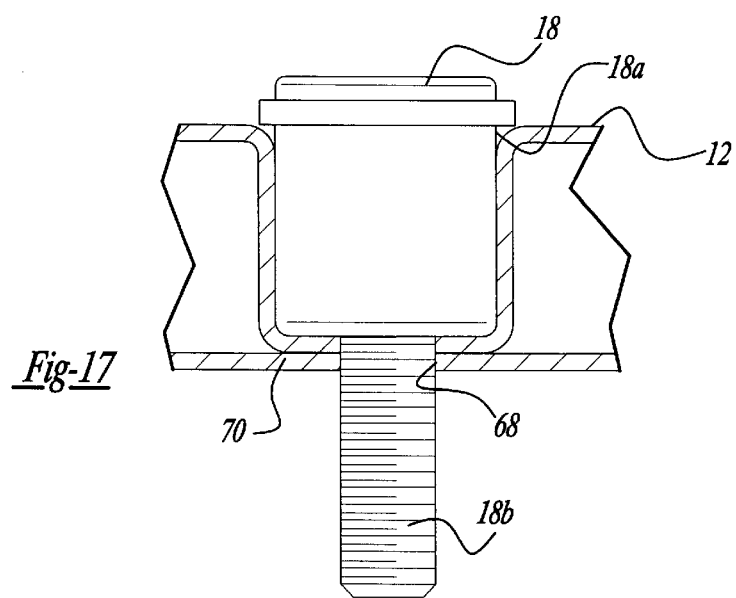
FIG. 17 is a cross-sectional view of the hydroformed control arm having a ball joint disposed in the ball joint cavity of the control arm.

Referring to FIG. 17, ball joint 18 is shown disposed in ball joint cavity 16 of hydroformed control arm 10. Preferably, the outer diameter of ball joint 18 is greater than the inner diameter of ball joint cavity 16, thereby creating a press fit connection between ball joint 18 and ball joint cavity 16. The press fit connection eliminates the need to provide the additional bushing element 110 disposed between hydroformed control arm 10 and the ball joint 18 of the prior art constructions discussed above.

It should be appreciated that the multi-piece hydroforming tool of the present invention enables multiple control arms to be hydroformed simultaneously. However, unlike the prior art method, the present invention hydroforms multiple control arms independently in a single die. This method of hydroforming minimizes the need to discard all of the hydroformed control arms if one hydroformed control arm is found to be defective. Furthermore, it should be appreciated that unlike the prior art methods of making a control arm, the present inventions provides a continuous, unitary hydroformed control arm. The unitary construction of the control arm is believed to improve the structural integrity of the control arm, thereby providing a more optimal design.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A multi-piece hydroforming tool for independently forming a plurality of control arms, said multi-piece hydroforming tool comprising:

a tooling die having an upper die member having a top portion and a bottom portion and a lower die member having a top portion and a bottom portion, at least one of said die members being vertically movable relative to the other of said die members;

a plurality of upper contoured surfaces disposed in said bottom portion of said upper die members;

a plurality of lower contoured surfaces disposed in said top portion of said lower die member, said plurality of lower contoured surfaces being aligned and spaced adjacent to said plurality of upper contoured surfaces, thereby defining a plurality of tooling cavities disposed in said tooling die;

a hydraulic pressure source for supplying a pressurized hydraulic fluid; and a plurality of injector manifolds in fluid communication with said hydraulic pressure source and said plurality of tooling cavities, each of said plurality of injector manifolds independently communicating said pressurized hydraulic fluid to said corresponding tooling cavity.

2. The multi-piece hydroforming tool according to claim 1, further comprising:

a plurality of forming tools for forming a ball joint cavity in each of the plurality of control arms, said plurality of forming tools disposed in at least one of said die members.

3. The multi-piece hydroforming tool according to claim 2, further comprising a plurality of piercing tools for piercing an aperture through each of said ball joint cavities, said plurality of piercing tools being disposed within said plurality of forming tools.

4. The multi-piece hydroforming tool according to claim 1, further comprising:

a plurality of extruding tools for extruding pivot bores in the plurality of control arms, said plurality of extruding tools being disposed in at least one of said die members.

5. A multi-piece hydroforming tool for independently forming a plurality of control arms, said multi-piece hydroforming tool comprising:

a tooling die;

a plurality of tooling cavities disposed in said tooling die;

a hydraulic pressure source for supplying a pressurized hydraulic fluid; and a plurality of injector manifolds in fluid communication with said hydraulic pressure source and said plurality of tooling cavities, each of said plurality of injector manifolds independently communicating said pressurized hydraulic fluid to said corresponding tooling cavity, each of said plurality of injector manifolds having:

an inlet port for receiving said pressurized hydraulic fluid from said hydraulic pressure source, said inlet port disposed on a first end of said injector manifold;

a fluid nozzle for delivering said pressurized hydraulic fluid into said corresponding tooling cavity, said fluid nozzle disposed on a second end of said injector manifold; and an aperture being in fluid communication with said inlet port and said fluid nozzle, said aperture completing a fluid circuit extending between said hydraulic pressure source and said corresponding tooling cavity.

6. A multi-piece hydroforming die for forming a member, said multi-piece hydroforming tool comprising:

a pair of die members, at least one of said pair of die members being vertically movable relative to the other of said pair of die members;

a plurality of contoured surfaces disposed in said pair of die members, said plurality of contoured surfaces being aligned and spaced to define a plurality of hydroforming cavities;

a plurality of hydraulic pressure sources for supplying pressurized hydraulic fluid; and a plurality of injector manifolds in individual fluid communication with each of said plurality of hydraulic pressure sources, each of said plurality of injector manifolds separately communicating said pressurized hydraulic fluid to one of said plurality of hydroforming cavities, each of said plurality of injector manifolds having:

an inlet port for receiving said pressurized hydraulic fluid from said hydraulic pressure source, said inlet port disposed on a first end of said injector manifold;

a fluid nozzle for delivering said pressurized hydraulic fluid into said hydroforming cavity, said fluid nozzle disposed on a second end of said injector manifold; and an aperture being in fluid communication with said inlet port and said fluid nozzle, said aperture completing the fluid circuit extending between said hydraulic pressure source and said hydroforming cavity.

7. The multi-piece hydroforming die according to claim 6, further comprising:

a plurality of forming tools for forming a cavity in the member, said plurality of forming tools disposed in at least one of said pair of die members;

a plurality of piercing tools disposed within said plurality of forming tools for piercing an aperture through the member; and a plurality of extruding tools for extruding the member, said plurality of extruding tools being disposed in at least one of said pair of die members.

8. A hydroforming tool for independently forming a plurality of pieces, said hydroforming tool comprising:

a die;

a plurality of cavities disposed in said die;

a hydraulic pressure source for supplying a pressurized hydraulic fluid;

a plurality of injector manifolds in fluid communication with said hydraulic pressure source and said plurality of cavities, each of said plurality of injector manifolds communicating said pressurized hydraulic fluid to said corresponding cavity; and a plurality of forming tools for forming a depression in each of the pieces, said plurality of forming tools disposed in said die.

9. The hydroforming tool according to claim 8, further comprising a plurality of piercing tools for piercing an aperture through each of said depressions, said plurality of piercing tools being disposed within said plurality of forming tools.

10. The hydroforming tool according to claim 8, further comprising:

a plurality of extruding tools for extruding pivot bores in each of the plurality of pieces, said plurality of extruding tools being disposed in said die.

11. The hydroforming tool according to claim 9 wherein said die further comprises:

an upper die member having a plurality of contoured surfaces; and a lower die member having a plurality of contoured surfaces, said plurality of contoured surfaces of said upper and lower die members defining a plurality of tooling cavities.

12. The hydroforming tool according to claim 11, wherein each of said plurality of injector manifolds include:

an inlet port for receiving said pressurized hydraulic fluid from said hydraulic pressure source, said inlet port disposed on a first end of said injector manifold;

a fluid nozzle for delivering said pressurized hydraulic fluid into said corresponding cavity, said fluid nozzle disposed on a second end of said injector manifold; and an aperture being in fluid communication with said inlet port and said fluid nozzle, said aperture completing a fluid circuit extending between said hydraulic pressure source and said corresponding cavity.

* * * * *

UNITED STATES PATENT AND TRADEMARK OFFICE
CERTIFICATE OF CORRECTION

PATENT NO. : 6,006,568
DATED : December 28, 1999
INVENTOR(S) : Hans Otto Bihrer

It is certified that error appears in the above-identified patent and that said Letters Patent is hereby corrected as shown below:

Title page,
Under References Cited, U.S. PATENT DOCUMENTS, add
-- 5,170,557 12/1992 Rigsby --.
Add -- 5,233,856 8/1993 Shimanovski et al. --.

Under References Cited, OTHER PUBLICATIONS, "Stips" should be -- Strips --.

Under Abstract, line 5, "a" should be -- an --.

Column 1,
Line 15, "66/078,697" should be -- 60/078,697 --.

Column 4,
Line 23, "FIG." should be -- FIGS. --.
Line 58, "10 b" should be -- 10b --.

Column 5,
Lines 29-30, "pre-scretched" should be -- prescretched --.

Signed and Sealed this

Sixth Day of November, 2001

*Attest:*

*Attesting Officer*

NICHOLAS P. GODICI
*Acting Director of the United States Patent and Trademark Office*